US011900843B2

(12) United States Patent
Kim et al.

(10) Patent No.: US 11,900,843 B2
(45) Date of Patent: Feb. 13, 2024

(54) DISPLAY DEVICE AND DISPLAY DRIVING METHOD

(71) Applicant: LG DISPLAY CO., LTD., Seoul (KR)

(72) Inventors: Jinwon Kim, Gyeonggi-do (KR); MooKyoung Hong, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/842,023

(22) Filed: Jun. 16, 2022

(65) Prior Publication Data

US 2023/0057700 A1 Feb. 23, 2023

(30) Foreign Application Priority Data

Aug. 18, 2021 (KR) ........................ 10-2021-0108560

(51) Int. Cl.
*G09G 3/00* (2006.01)
*G09G 3/20* (2006.01)

(52) U.S. Cl.
CPC ........... *G09G 3/006* (2013.01); *G09G 3/2074* (2013.01); *G09G 2300/0866* (2013.01); *G09G 2330/028* (2013.01); *G09G 2330/08* (2013.01); *G09G 2330/10* (2013.01); *G09G 2330/12* (2013.01)

(58) Field of Classification Search
CPC ................. G09G 3/006; G09G 3/2074; G09G 2300/0866; G09G 2330/028; G09G 2330/10; G09G 2330/08; G09G 2330/12
See application file for complete search history.

(56) References Cited

U.S. PATENT DOCUMENTS

2017/0004773 A1* 1/2017 Kim ..................... G09G 3/3258
2018/0033373 A1* 2/2018 Hong ..................... G09G 3/325
2018/0061296 A1* 3/2018 Shim .................... G09G 3/3233

* cited by examiner

*Primary Examiner* — Nitin Patel
*Assistant Examiner* — Saifeldin E Elnafia
(74) *Attorney, Agent, or Firm* — POLSINELLI PC

(57) ABSTRACT

A display device includes a display panel in which a plurality of subpixels including a light emitting element that emits light by a high potential voltage supplied to a driving voltage line, and a plurality of reference voltage lines connected to the plurality of subpixels to detect a characteristic value are disposed; a data driving circuit configured to supply a low potential voltage to the driving voltage line through the plurality of reference voltage lines; a base voltage switching circuit configured to control a ground voltage node connected to a cathode electrode of the light emitting element; a current detecting circuit configured to detect a current flowing between the base voltage node and a ground; and a timing controller configured to control the base voltage switching circuit and generate a defect detection signal for the driving voltage line according to a current detected by the current detecting circuit.

12 Claims, 10 Drawing Sheets

DISPLAY DEVICE AND DISPLAY DRIVING METHOD

CROSS-REFERENCE TO RELATED APPLICATION

This application claims the priority of Korean Patent Applications No. 10-2021-0108560, filed on Aug. 18, 2021, which is hereby incorporated by reference in its entirety.

BACKGROUND

Field of the Disclosure

The present disclosure relates to a display device and a display driving method capable of effectively detecting a defect in a voltage line or a display panel.

Description of the Background

With the development of the information society, there has been an increasing demand for a variety of types of image display devices. In this regard, a range of display devices, such as liquid crystal display device, and organic light emitting display device, have recently come into widespread use.

Among such display devices, the organic light emitting display devices have superior properties, such as rapid response speeds, high contrast ratios, high emissive efficiency, high luminance, and wide viewing angles, since self-emissive organic light emitting diodes are used.

Such an organic light emitting display device may include light emitting elements disposed in a plurality of subpixels aligned in a display panel, and may control the light emitting elements to emit light by controlling the current flowing through the light emitting elements, so as to display an image while controlling luminance of the subpixels.

Such a display device includes a driving voltage supply source for supplying various driving voltages required for driving the display panel to the driving circuit and the display panel, and various components for transmitting the driving voltages.

Such a display device includes a display panel in which a plurality of subpixels are arranged in a matrix form. The display panel receives scan signals from a gate driving circuit and data voltages from a data driving circuit to drive each of the subpixels. Also, the display panel receives a plurality of driving voltages from a power management circuit.

At this time, when a crack occurs due to an impact applied to the display panel from the outside, a plurality of driving voltage lines in the display panel may be shorted or open to each other.

For example, a high potential voltage line receiving a high potential voltage from the power management circuit may be shorted to a low potential voltage line receiving a low potential voltage, or a voltage line may be shorted to the display panel.

When an overcurrent flows in the driving voltage line or the display panel due to such a defect, the voltage line may be disconnected or a burnt phenomenon in which the display panel is burned may be occurred due to the overcurrent.

SUMMARY

Accordingly, the present disclosure is to provide a display device and a display driving method capable of effectively detecting a defect in a voltage line or a display panel.

The present disclosure is also to provide a display device and a display driving method capable of diminishing damage to a display panel due to a high potential voltage and effectively detecting a defect in the display panel by using a display driving reference voltage.

Further, the present disclosure is to provide a display device and a display driving method capable of effectively diminishing damage to a display panel due to a high potential voltage by detecting a defect in a driving voltage line or a display panel before supplying the high potential voltage to a subpixel.

In an aspect of the present disclosure, a display device includes a display panel in which a plurality of subpixels including a light emitting element that emits light by a high potential voltage supplied to a driving voltage line, and a plurality of reference voltage lines connected to the plurality of subpixels to detect a characteristic value are disposed, a data driving circuit configured to supply a low potential voltage, lower than the high potential voltage, to the driving voltage line through the plurality of reference voltage lines, a base voltage switching circuit configured to control a base voltage node connected to a cathode electrode of the light emitting element, a current detecting circuit configured to detect a current flowing between the base voltage node and a ground, and a timing controller configured to control the base voltage switching circuit and generate a defect detection signal for the driving voltage line according to a current detected by the current detecting circuit.

In another aspect of the present disclosure, a display driving method for driving a display device includes a display panel in which a plurality of subpixels with a light emitting element that emits light by a high potential voltage supplied to a driving voltage line and a plurality of reference voltage lines connected to the plurality of subpixels to detect a characteristic value are disposed, comprising, maintaining a high potential voltage node at a level lower than a display driving reference voltage, floating a base voltage node, supplying a low potential voltage to a driving voltage line, detecting a current between the base voltage node and a ground, comparing a detected current with a reference value, and generating a defect detection signal according to a result of comparing the detected current with the reference value.

According to the present disclosure, a display device and a display driving method can effectively detect a defect in a voltage line or a display panel.

According to the present disclosure, a display device and a display driving method can diminish damage to a display panel due to a high potential voltage and effectively detect a defect in the display panel by using a display driving reference voltage.

According to the present disclosure, a display device and a display driving method can effectively diminish damage to a display panel due to a high potential voltage by detecting a defect in a driving voltage line or a display panel before supplying the high potential voltage to a subpixel.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1:
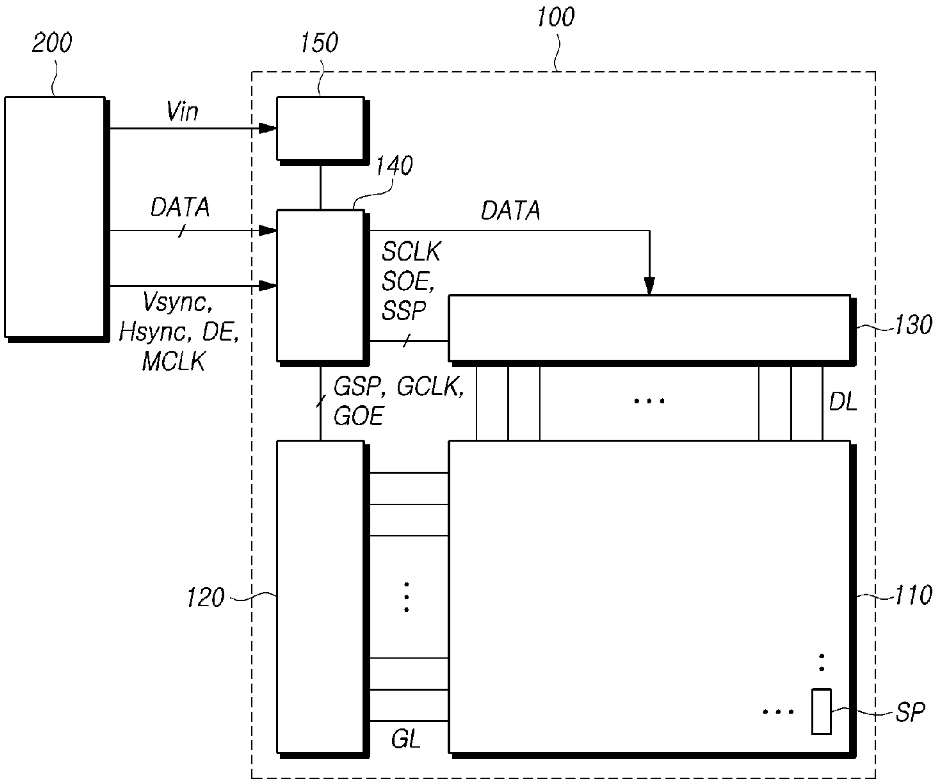
FIG. 1 illustrates a schematic diagram of a display device according to the present disclosure.

Hereinafter, some aspects of the present disclosure will be described in detail with reference to exemplary drawings. In the following description of examples or aspects of the present disclosure, reference will be made to the accompanying drawings in which it is shown by way of illustration specific examples or aspects that can be implemented, and in which the same reference numerals and signs can be used to designate the same or like components even when they are shown in different accompanying drawings from one another. Further, in the following description of examples or aspects of the present disclosure, detailed descriptions of well-known functions and components incorporated herein will be omitted when it is determined that the description may make the subject matter in some aspects of the present disclosure rather unclear. The terms such as “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” may be used herein to describe elements of the present disclosure. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element may be included in at least one of two or more elements that “are connected or coupled to”, “contact or overlap”, etc. each other.

When time relative terms, such as “after,” “subsequent to,” “next,” “before,” and the like, are used to describe processes or operations of elements or configurations, or flows or steps in operating, processing, manufacturing methods, these terms may be used to describe non-consecutive or non-sequential processes or operations unless the term “directly” or “immediately” is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term “may” fully encompasses all the meanings of the term “can”.

Hereinafter, various aspects of the present disclosure will be described in detail with reference to the accompanying drawings.

FIG. 1 illustrates a schematic diagram of a display device according to the present disclosure.

Referring to FIG. 1, the display device 100 according to the present disclosure may include a display panel 110 connected to a plurality of gate lines GL and a plurality of data lines DL in which a plurality of subpixels SP are arranged in rows and columns, a gate driving circuit 120 for supplying scan signals to the plurality of gate lines GL and a data driving circuit 130 for supplying data voltages to the plurality of data lines DL, a timing controller 140 for controlling the gate driving circuit 120 and the data driving circuit 130, and a power management circuit 150.

The display panel 110 displays an image based on the scan signals supplied from the gate driving circuit 120 through the plurality of gate lines GL and the data voltages supplied from the data driving circuit 130 through the plurality of data lines DL.

In the case of a liquid crystal display, the display panel 110 includes a liquid crystal layer formed between two substrates, and TN (Twisted Nematic) mode, VA (Vertical Alignment) mode, IPS (In Plane Switching) mode, FFS (Fringe Field Switching) mode may be operated in any known mode. In the case of an organic light emitting display device, the display panel 110 may be implemented in a top emission method, a bottom emission method, or a dual emission method.

In the display panel 110, a plurality of pixels may be disposed in a matrix form. Each pixel may be composed of subpixels SP of different colors, for example, a white subpixel, a red subpixel, a green subpixel, and a blue subpixel. Each subpixel SP may be defined by the plurality of the data lines DL and the plurality of the gate lines GL.

A subpixel SP may include a thin film transistor (TFT) arranged in a region where a data line DL and a gate line GL intersect, a light emitting element such as an organic light emitting diode which is emitted according to the data voltage, and a storage capacitor for maintaining the data voltage by being electrically connected to the light emitting element.

For example, when the display device 100 having a resolution of 2,160×3,840 includes four subpixels SP of white W, red R, green G, and blue B, 3,840×4=15,360 data lines DL may be provided by 2,160 gate lines GL and 3,840 data lines DL respectively connected to 4 subpixels WRGB. Each of the plurality of subpixels SP may be disposed in areas in which the plurality of gate lines GL cross the plurality of data lines DL.

The gate driving circuit 120 is controlled by the timing controller 140, and controls the driving timing of the plurality of subpixels SP by sequentially supplying the scan signals to the plurality of gate lines GL disposed in the display panel 110.

In the display device 100 having a resolution of 2,160×3,840, an operation of sequentially supplying the scan signals to the 2,160 gate lines GL from the first gate line GL1 to the 2,160$^{th}$ gate line GL2160 may be referred to as 2,160-phase driving operation. Otherwise, an operation of sequentially supplying the scan signals to every four gate lines GL, as in a case in which the scan signals are supplied sequentially from first gate line GL1 to fourth gate lines GL4, and then are supplied sequentially from fifth gate line GL5 to eighth gate line GL8, may be referred to as 4-phase driving operation. As described above, an operation in which the scan signals are supplied sequentially to every N number of gate lines may be referred as N-phase driving operation.

The gate driving circuit 120 may include one or more gate driving integrated circuits (GDIC), which may be disposed on one side or both sides of the display panel 110 depending on the driving method. Alternatively, the gate driving circuit 120 may be implemented in a gate-in-panel (GIP) structure embedded in a bezel area of the display panel 110.

The data driving circuit 130 receives image data DATA from the timing controller 140, and converts the received image data DATA into an analog data voltage. Then, the data driving circuit 130 supplies the analog data voltage to each of the data lines DL at time which the scan signal is supplied through the gate line GL, so that each of the subpixels SP connected to the data lines DL emits light with a corresponding luminance in response to the analog data voltage.

Likewise, the data driving circuit 130 may include one or more source driving integrated circuits (SDIC). Each of the source driving integrated circuits SDIC may be connected to a bonding pad of the display panel 110 by a tape automated bonding (TAB) or a chip on glass (COG), or may be directly mounted on the display panel 110.

In some cases, each of the source driving integrated circuits (SDIC) may be integrated with the display panel 110. In addition, each of the source driving integrated circuits (SDIC) may be implemented with a chip on film (COF) structure. In this case, the source driving integrated circuit SDIC may be mounted on circuit film to be electrically connected to the data lines DL in the display panel 110 via the circuit film.

The timing controller 140 supplies various control signals to the gate driving circuit 120 and the data driving circuit 130, and controls the operations of the gate driving circuit 120 and the data driving circuit 130. That is, the timing controller 140 controls the gate driving circuit 120 to supply the scan signals in response to a time realized by respective frames, and on the other hand, transmits the digital image data DATA from an external source to the data driving circuit 130.

Here, the timing controller 140 receives not only the image data DATA, but also various timing signals, including a vertical synchronization signal Vsync, a horizontal synchronization signal Hsync, a data enable signal DE, and a main clock MCLK, from a host system 200.

The host system 200 may be any one of a Television (TV) system, a set-top box, a navigation system, a personal computer (PC), a home theater system, a mobile device, and a wearable device.

Accordingly, the timing controller 140 generates control signals using the various timing signals received from the host system 200, and supplies the control signals to the gate driving circuit 120 and the data driving circuit 130.

For example, the timing controller 140 generates various gate control signals, including a gate start pulse GSP, a gate clock GCLK, and a gate output enable signal GOE, to control the gate driving circuit 120. Here, the gate start pulse GSP is used to control the start timing of one or more gate driving integrated circuits GDIC of the gate driving circuit 120. In addition, the gate clock GCLK is a clock signal commonly supplied to the one or more gate driving integrated circuits GDIC for controlling the shift timing of the scan signals. The gate output enable signal GOE designates timing information of the one or more gate driving integrated circuits GDIC.

In addition, the timing controller 140 generates various data control signals, including a source start pulse SSP, a source sampling clock SSC, and a source output enable signal SOE, to control the data driving circuit 130. Here, the source start pulse SSP is used to control the start timing for the data sampling of one or more source driving integrated circuits SDIC of the data driving circuit 130. The source sampling clock SSC is a clock signal for controlling a timing of data sampling in each of the source driving integrated circuits SDIC. The source output enable signal SOE controls the output timing of the data driving circuit 130.

The display device 100 may include a power management circuit 150 for supplying or controlling various voltage or current to the display panel 110, the gate driving circuit 120, and the data driving circuit 130.

The power management circuit 150 generates a power to drive the display panel 100, the gate driving circuit 120, and the data driving circuit 130 by regulating the DC input voltage Vin supplied from the host system 200.

Meanwhile, the subpixel SP may be positioned at a point where the gate lines GL and the data lines DL intersect, and a light emitting element may be disposed in each subpixel SP. For example, the organic light emitting display device may include a light emitting element, such as an organic light emitting diode in each of the subpixels SP, and may display an image by controlling current flowing through the light emitting elements in response to the data voltage.

Such display devices 100 may be various types of devices such as a liquid crystal display, an organic light emitting display, and a plasma display panel.

Figure 2:
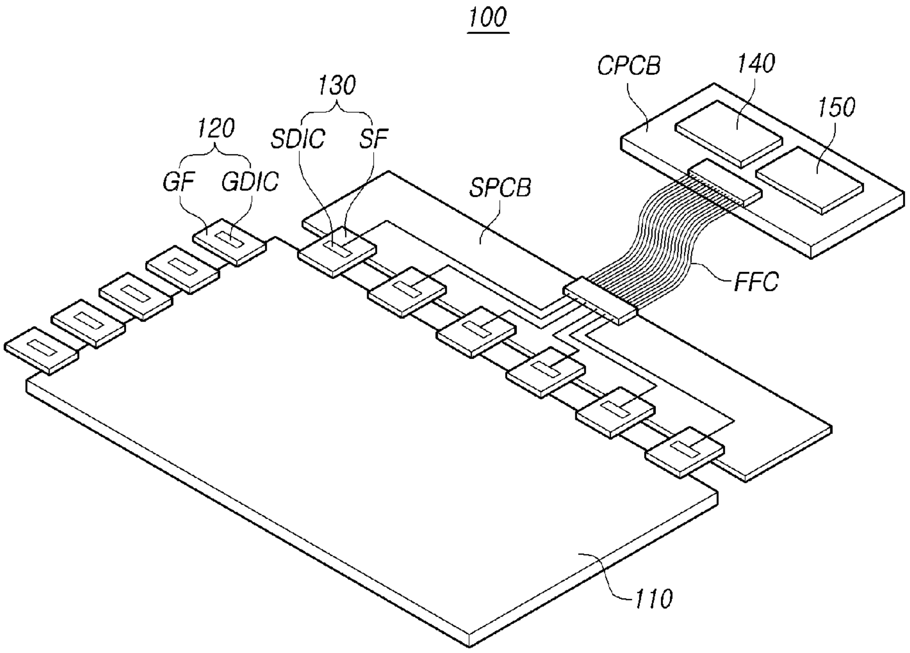
FIG. 2 illustrates a system diagram of the display device according to the present disclosure.

FIG. 2 illustrates a system diagram of the display device according to the present disclosure.

Referring to FIG. 2, each of the source driving integrated circuits SDIC of the data driving circuit 130 and the gate driving circuit 120 in the display device 100 according to the present disclosure may be implemented with a COF type among various structures such as a TAB, a COG, and a COF.

AT least one of gate driving integrated circuits GDIC included in the gate driving circuit 120 may be mounted on each gate film GF, and one side of the gate film GF may be electrically connected to the display panel 110. Also, electrical lines for electrically connecting the gate driving integrated circuit GDIC and the display panel 110 may be disposed on the gate film GF.

Likewise, the data driving circuit 130 may include one or more source driving integrated circuits SDIC, which may be mounted on the source film SF, respectively. One portion of the source film SF may be electrically connected to the display panel 110. In addition, electrical lines may be disposed on the source films SF to electrically connect the source driving integrated circuits SDIC and the display panel 110.

The display device 100 may include at least one source printed circuit board SPCB in order to connect the plurality of source driving integrated circuits SDIC to other devices by electrical circuit, and a control printed circuit board CPCB in order to mount various control components and electric elements.

The other portion of the source film SF, on which the source driving integrated circuit SDIC is mounted, may be connected to the at least one source printed circuit board SPCB. That is, one portion of source film SF on which the source driving integrated circuit SDIC is mounted may be electrically connected to the display panel 110, and the other portion of the source film SF may be electrically connected to the source printed circuit board SPCB.

The timing controller 140 and a power management circuit 150 may be mounted on the control printed circuit board CPCB. The timing controller 140 may control the operations of the data driving circuit 130 and the gate driving circuit 120. The power management circuit 150 may supply a driving voltage and a driving current, or control a voltage and a current for the data driving circuit 130 and the gate driving circuit 120.

At least one source printed circuit board SPCB and the control printed circuit board CPCB may have circuitry connection by at least one connecting member. The connecting member may be, for example, a flexible printed circuit FPC, a flexible flat cable FFC, or the like. In this case, the connecting member for connecting the at least one source printed circuit board SPCB and the control printed circuit board CPCB may be variously changed according to the size and type of the display device 100. At least one source printed circuit board SPCB and the control printed circuit board CPCB may be integrated into a single printed circuit board.

In the display device 100 having the above described configuration, the power management circuit 150 supplies the driving voltage, which is required for a display driving operation or a sensing operation of the characteristic value, to the source printed circuit board SPCB through the flexible printed circuit FPC or the flexible flat cable FFC. The driving voltage supplied to the source printed circuit board SPCB, is transmitted to emit or sense a specific subpixel SP in the display panel 110 via the source driving integrated circuits SDIC.

Each of the subpixels SP arranged in the display panel 110 of the display device 100 may include an organic light emitting diode as a light emitting element and circuit elements such as a driving transistor to drive it.

The type and number of the circuit elements constituting each of the subpixels SP may be variously determined depending on the function, the design, or the like.

Figure 3:
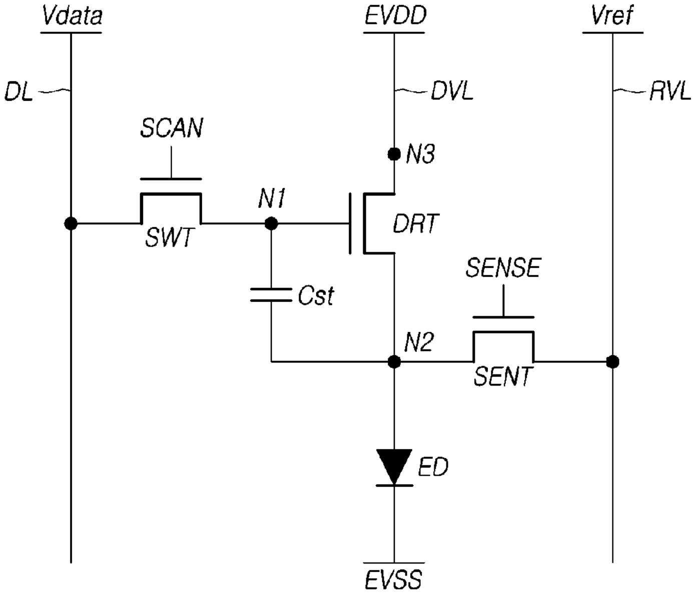
FIG. 3 illustrates a circuit diagram of a subpixel in the display device according to the present disclosure.

FIG. 3 illustrates a circuit diagram of a subpixel in the display device according to the present disclosure.

Referring to FIG. 3, each of the subpixels SP arranged in the display device 100 according to the present disclosure may include one or more transistors, a capacitor, and an organic light emitting diode as a light emitting element ED.

For example, a subpixel SP may include a driving transistor DRT, a switching transistor SWT, a sensing transistor SENT, a storage capacitor Cst, and a light emitting element ED.

The driving transistor DRT may have a first node N1, a second node N2, and a third node N3. The first node N1 of the driving transistor DRT may be a gate node to be supplied a data voltage Vdata through a data line DL when the switching transistor SWT is turned on. The second node N2 of the driving transistor DRT may be electrically connected to an anode electrode of the light emitting element ED, and may be a drain node or a source node. The third node N3 of the driving transistor DRT may be electrically connected to a driving voltage line DVL to be supplied a driving voltage EVDD, and may be a source node or a drain node.

Here, a subpixel driving voltage EVDD for displaying an image may be supplied to the driving voltage line DVL in the display driving period. For example, the subpixel driving voltage EVDD for displaying the image may be a high potential voltage with 27 V.

The switching transistor SWT is electrically connected between the first node N1 of the driving transistor DRT and the data line DL, and operates in response to a scan signal SCAN supplied thereto through the gate line GL connected to the gate node. In addition, it controls the operation of the driving transistor DRT by transmitting the data voltage Vdata through the data line DL to the gate node of the driving transistor DRT when the switching transistor SWT is turned on.

The sensing transistor SENT is electrically connected between the second node N2 of the driving transistor DRT and a reference voltage line RVL, and operates in response to a sense signal SENSE supplied through the gate line GL connected to a gate node. When the sensing transistor SENT is turned on, a reference voltage Vref supplied from the reference voltage line RVL is transmitted to the second node N2 of the driving transistor DRT.

That is, the voltages of the first node N1 and the second node N2 of the driving transistor DRT may be controlled by controlling the switching transistor SWT and the sensing transistor SENT. Consequently, a current for emitting the light emitting element ED may be supplied.

Each gate node of the switching transistor SWT and the sensing transistor SENT may be connected to a single gate line GL or to different gate lines GL. Here, it illustrates an exemplary structure of which the switching transistor SWT and the sensing transistor SENT are connected to a different gate lines GL. In this case, the switching transistor SWT and the sensing transistor SENT are controlled independently by the scan signal SCAN and the sense signal SENSE transmitted from the different gate lines GL.

On the other hand, when the switching transistor SWT and the sensing transistor SENT are connected to single gate line GL, the switching transistor SWT and the sensing transistor SENT are controlled simultaneously by the scan signal SCAN or the sense signal SENSE transmitted from the single gate line GL, and thus the aperture ratio of the subpixels SP may be improved.

In addition, the transistors disposed in the subpixels SP may be not only n-type transistors, but also p-type transistors. Herein, it illustrates the exemplary structure of the n-type transistors.

The storage capacitor Cst is electrically connected between the first node N1 and the second node N2 of the driving transistor DRT, and serves to maintain the data voltage Vdata during a frame.

Such a storage capacitor Cst may be connected between the first node N1 and the third node N3 of the driving transistor DRT according to a type of the driving transistor DRT. The anode electrode of the light emitting element ED may be electrically connected to the second node N2 of the driving transistor DRT, and a base voltage EVSS may be supplied to a cathode electrode of the light emitting diode EL.

Here, the base voltage EVSS may be the ground voltage or a voltage higher or lower than the ground voltage. In addition, the base voltage EVSS may be varied depending on the driving condition. For example, the base voltage EVSS during the display driving period may be different from the base voltage EVSS during the sensing period.

The structure of the subpixel SP described as an example above is a 3T1C (3 Transistors 1 Capacitor) structure, which is only an example for explanation, and further includes one or more transistors, or in some cases, further includes one or more capacitors. Alternatively, each of the plurality of subpixels SP may have the same structure, or some of the plurality of subpixels SP may have different structures.

The display device 100 according to the present disclosure may use a method for measuring a current flowing by voltage charged in the storage capacitor Cst during a sensing period of the characteristic value for the driving transistor DRT in order to effectually sense the characteristic value of the driving transistor DRT like threshold voltage or mobility. Such a method may be referred to as a current sensing operation.

That is, the characteristic value or variation of the characteristic value of the driving transistor DRT in the subpixel SP may be determined by measuring the current flowing by voltage charged in the storage capacitor Cst during the sensing period of the characteristic value for the driving transistor DRT.

At this time, the reference voltage line RVL may be referred to as a sensing line since the reference voltage line RVL serves not only to supply the reference voltage Vref but also serves as a sensing line for sensing the characteristic value of the driving transistor DRT in the subpixel SP.

Figure 4:
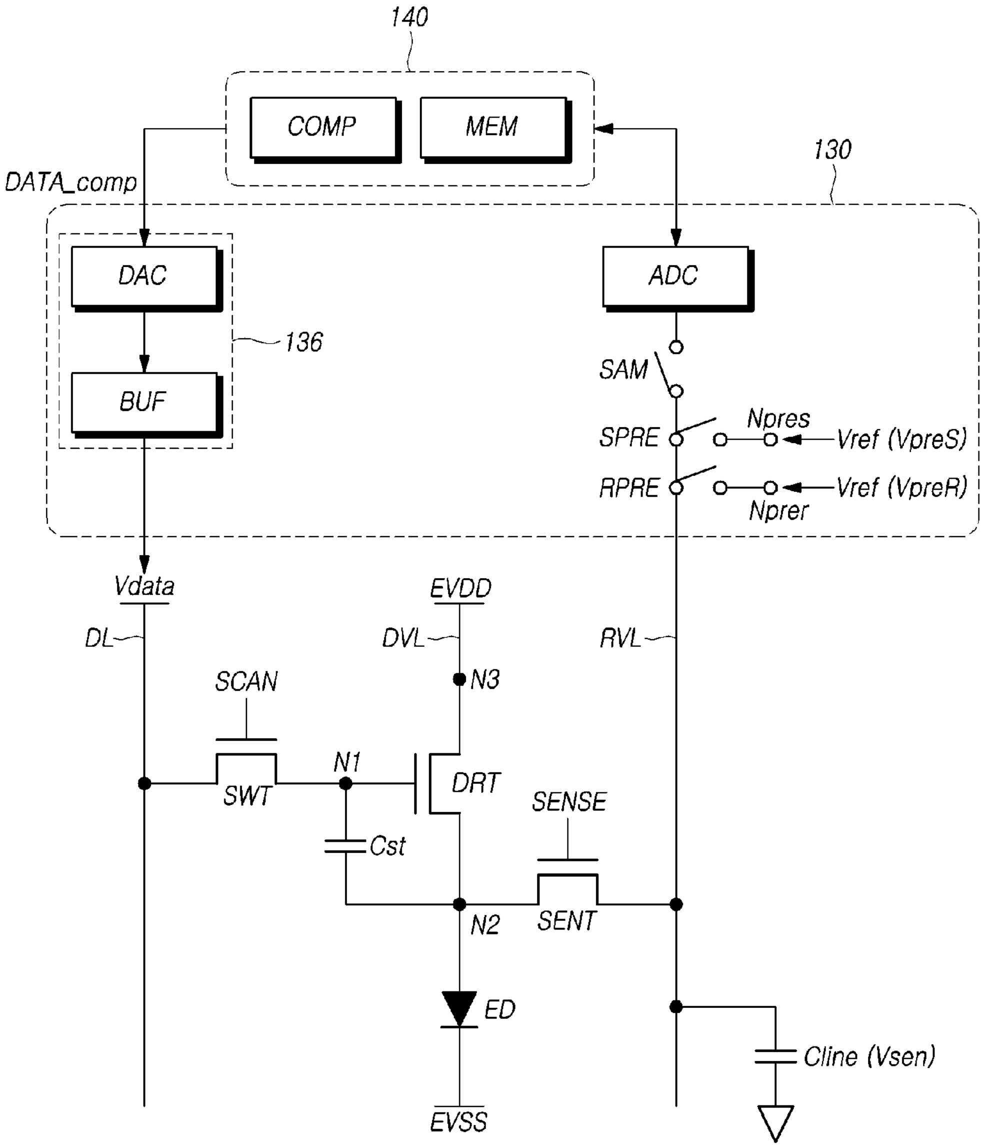
FIG. 4 illustrates an exemplary circuit structure for sensing a characteristic value of a driving transistor in a display device according to the present disclosure.

FIG. 4 illustrates an exemplary circuit structure for sensing a characteristic value of a driving transistor in a display device according to the present disclosure.

Referring to FIG. 4, the display device 100 according to the present disclosure may include components for compensating for deviation in characteristic values of the driving transistor DRT.

For example, characteristic value or a difference in the characteristic value of a driving transistor DRT may be reflected to a voltage in a second node N2 of the driving transistor DRT (e.g., Vdata−Vth).

The voltage in the second node N2 of the driving transistor DRT may be corresponded to a voltage in a reference voltage line RVL when a sensing transistor SENT is tuned on. Further, by the voltage in the second node N2 of the driving transistor DRT, a line capacitor Cline across the reference voltage line RVL may be charged, and the reference voltage line RVL may have a voltage corresponding to a voltage in the second node N2 of the driving transistor DRT by a sensing voltage Vsen charged in the line capacitor Cline.

The display device 100 may include an analog to digital converter ADC measuring a voltage in the reference voltage line RVL corresponding to a voltage in the second node N2 of the driving transistor DRT and then converting the measured voltage into a digital data, and switches SAM, SPRE for sensing one or more characteristic values of the driving transistor DRT.

The switch circuits SAM, SPRE for controlling the sensing operation of the characteristic value may include a sensing reference switch SPRE for controlling a connection between the reference voltage line RVL and a sensing reference voltage node Npres to which a reference voltage Vref is supplied, and a sampling switch SAM for controlling a connection between the reference voltage line RVL and the analog to digital converter ADC.

Here, the sensing reference switch SPRE is a switch for controlling the sensing operation of the characteristic value, and a reference voltage Vref supplied to the reference voltage line RVL by the sensing reference switch SPRE during a sensing operation corresponds to a sensing reference voltage VpreS.

Further, the switch circuit for sensing characteristic values of the driving transistor DRT may include a display driving reference switch RPRE. The display driving reference switch RPRE controls a connection between the reference voltage line RVL and a display driving reference voltage node Nprer to which the reference voltage Vref is supplied.

The display driving reference switch RPRE is a switch for controlling the display driving operation. The reference voltage Vref supplied to the reference voltage line RVL by the display driving reference switch RPRE during a display operation corresponds to a display driving reference voltage VpreR.

The display driving reference switch RPRE and the sensing reference switch SPRE may be provided separately from each other, or integrated with each other and in turn, implemented in a single body. The display driving reference voltage VpreR and the sensing reference voltage VpreS may have an identical voltage value or different voltage values.

The timing controller 140 of the display device 100 may include a memory MEM storing data supplied from the analog to digital converter ADC or storing one or more reference voltages in advance, and a compensating circuit COMP for compensating a difference in one or more characteristic values by comparing the received data and reference voltages stored in the memory MEM. In this case, the compensating value calculated by the compensating circuit COMP may be stored in the memory MEM.

The timing controller 140 may compensate image data DATA to be provided to the data driving circuit 130 using the compensating value calculated by the compensating circuit COMP, and then supply the compensated image data DATA_comp to the data driving circuit 130.

According to this, the data driving circuit 130 may convert the compensated image data DATA_comp into a compensated data voltage Vdata_comp in the form of an analog signal through a digital to analog converter DAC, and transmit the compensated data voltage Vdata_comp to a corresponding data line DL through an output buffer BUF. As a result, a deviation in one or more characteristic values (a deviation of threshold voltage or a deviation of mobility) for a driving transistor DRT in a corresponding subpixel SP may be compensated.

Meanwhile, the data driving circuit 130 may include a data voltage output circuit 136 including a latch circuit, the digital to analog converter DAC, the output buffer BUF, and the like. In some instances, the data driving circuit 130 may further include an analog to digital converter ADC and several types of switches SAM, SPRE, RPRE. In another aspect, the analog to digital converter ADC and the several types of switches SAM, SPRE, RPRE may be located outside of the data driving circuit 130.

Further, the compensating circuit COMP may be located outside of the timing controller 140 or included inside of the timing controller 140. The memory MEM may be located outside of the timing controller 140 or implemented in the form of a register inside of the timing controller 140.

The display device 100 according to the present disclosure may diminish the driving voltage line from being disconnected or the display panel from burning by supplying a high potential voltage at a state in which a defect occurs in the driving voltage line. In particular, the display device 100 according to the present disclosure may detect a defect in the driving voltage line before the high potential voltage is supplied to the subpixel SP, thereby effectively diminishing damage to the display panel due to the high potential voltage.

Figure 5:
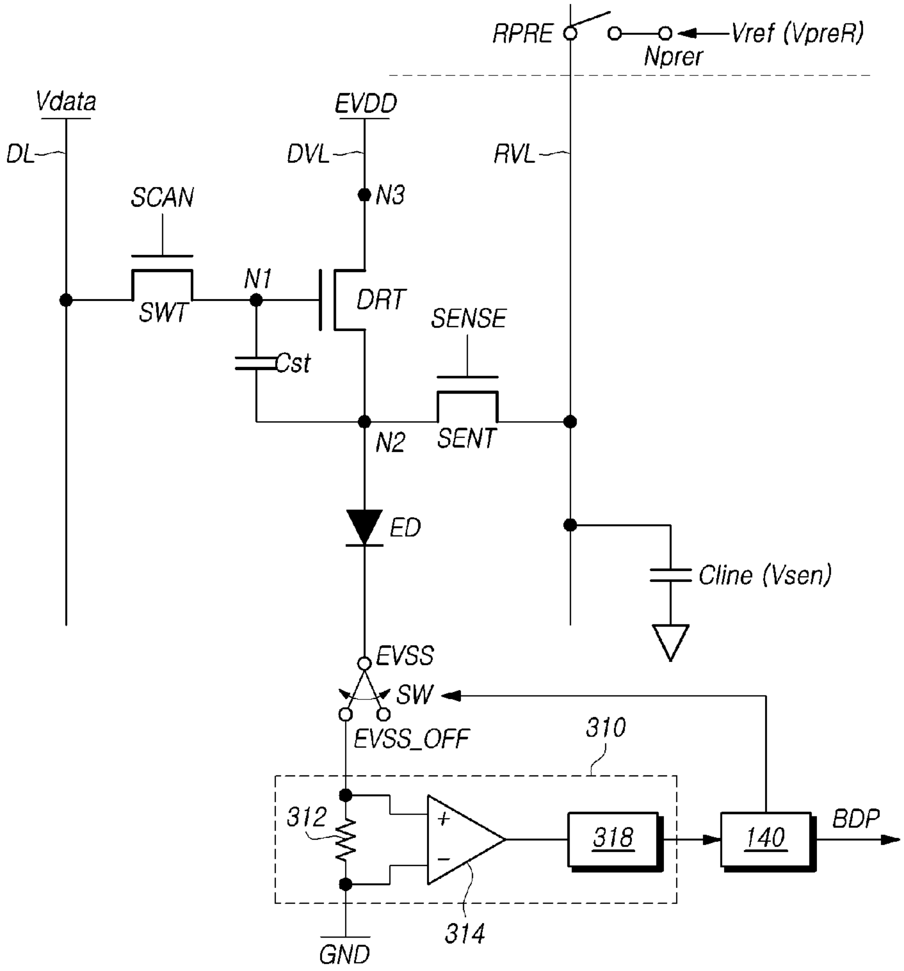
FIG. 5 illustrates an exemplary circuit for detecting a defect of a driving voltage line in a display device according to the present disclosure.

FIG. 5 illustrates an exemplary circuit for detecting a defect of a driving voltage line in a display device according to the present disclosure.

Referring to FIG. 5, the display device 100 according to the present disclosure may include a base voltage switching circuit SW for converting the base voltage EVSS to a ground GND or floating state, a current detecting circuit 310 for detecting current flowing between the base voltage switching circuit SW and the ground GND, and a timing controller 140 for controlling the base voltage switching circuit SW and for determining a defect of a driving voltage line DVL according to a detecting result of the current detecting circuit 310.

The base voltage switching circuit SW may be electrically connected to a cathode electrode of the light emitting element ED receiving the subpixel driving voltage EVDD through the driving transistor DRT, and may switch a base voltage node N(EVSS) receiving the base voltage EVSS to be electrically connected to the ground GND or to a floating state by the timing controller 140. The base voltage switching circuit SW may be composed of a plurality of transistors, or a transistor and other circuit elements together.

Accordingly, the current detecting circuit 310 connected between the base voltage switching circuit SW and the ground GND may detect a current flowing through the base voltage node N(EVSS) to the ground GND at a state in which the base voltage node N(EVSS) is electrically connected to the ground GND or the base voltage node N(EVSS) is electrically floated.

Accordingly, the current detecting circuit 310 detects a current flowing through the base voltage node N(EVSS) between the subpixel driving voltage EVDD and the ground GND.

The timing controller 140 controls an operation of the display driving reference switch RPRE to determine when the display driving reference voltage VpreR is supplied through the reference voltage line RVL.

Also, the timing controller 140 controls the reference voltage switching circuit SW so that the base voltage node N(EVSS) is electrically connected to the ground GND or is in an electrically floating state.

In addition, the timing controller 140 determines whether the driving voltage line DVL is defective according to a signal provided from the current detecting circuit 310, and generates a defect detection signal BDP when it is determined that the driving voltage line DVL is defective.

The current detecting circuit 310 may be composed of a resistor 312 for sensing a current, an operational amplifier 314, and a level detecting circuit 318 for determining a level of the sensing current.

The resistor 312 may have a low resistance value for sensing a current, and may be connected between the base voltage node N(EVSS) and the ground GND.

The operational amplifier 314 has an inverting input terminal and a non-inverting input terminal connected to both ends of the resistor 312, so that it generates a voltage proportional to a current flowing through the resistor 312 from the base voltage node N(EVSS) to the ground (GND).

The level detecting circuit 318 generates a high level signal if the signal transmitted from the operational amplifier 314 is equal to or greater than a predetermined reference value, and generates a low level signal otherwise. That is, the level detecting circuit 318 serves to transmit a signal indicating a state that an overcurrent equal to or greater than a predetermined reference value flows through the resistor 312, to the timing controller 140.

Accordingly, the timing controller 140 may determine that a defect like a short occurs in the driving voltage line DVL and generate a defect detection signal BDP with high level when it detects a overcurrent greater than or equal to the reference value through the current detecting circuit 310 while the base voltage node N(EVSS) is floating, that is, when the current detecting circuit 310 transmits a high level signal to the timing controller 140.

Of course, it is only an example that a high level signal is transmitted to the timing controller 140 when a current detected through the current detecting circuit 310 is equal to or greater than the reference value. According to a configuration of the level detecting circuit 318 or the timing controller 140, a low level signal may be transmitted to the timing controller 140 when a current greater than or equal to a reference value is detected through the current detecting circuit 310, and a high level signal may be transmitted to the timing controller 140 when a current less than the reference value is detected through the current detecting circuit 310.

As a result, before or after shipment of the display device 100, the defective part may be replaced or repaired by checking the defect of the specific driving voltage line DVL.

The specific process for determining a defective state of the driving voltage line DVL will be described in more detail by using a display driving reference voltage VpreR supplied to the driving voltage line DVL according to the connection state of the base voltage node N(EVSS).

Figure 6:
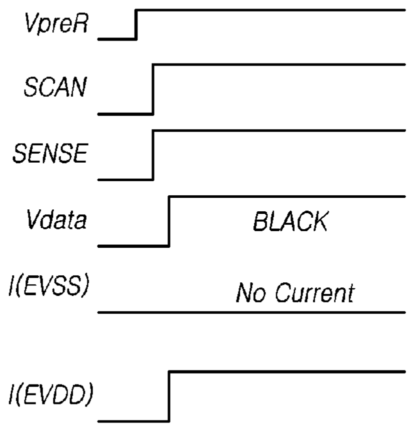
FIG. 6 illustrates a signal flow diagram when a driving voltage line is normal in a display device according to the present disclosure.
Figure 7:
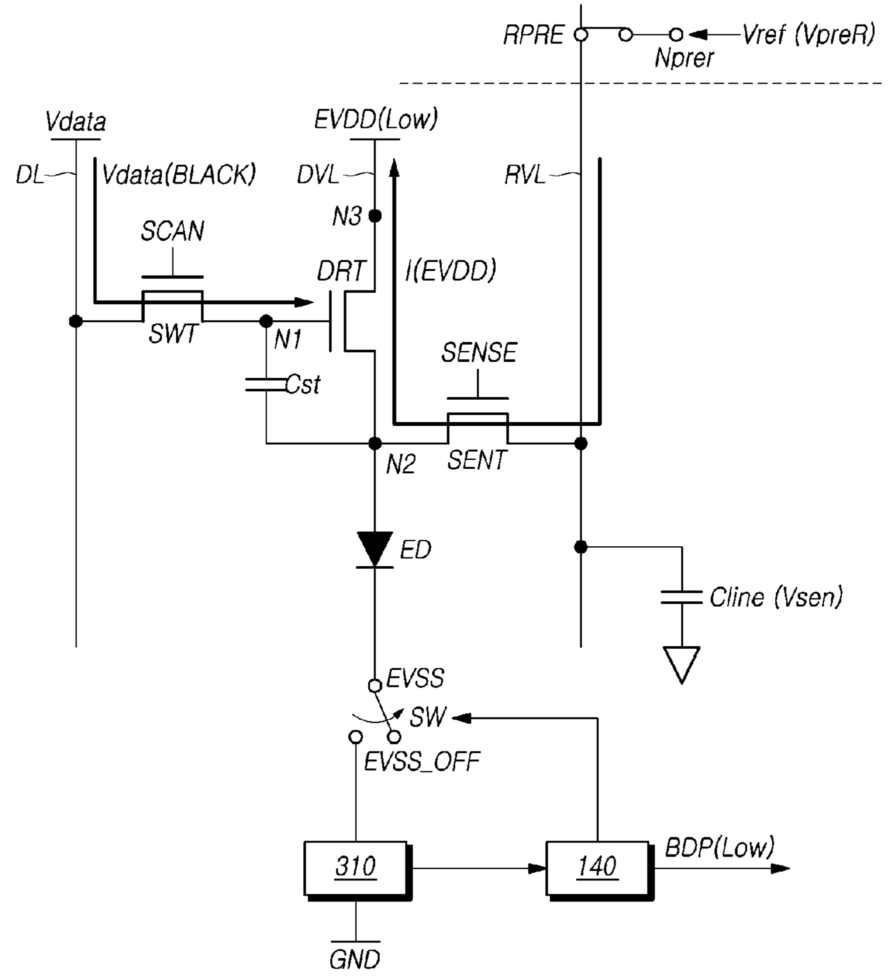
FIG. 7 illustrates an exemplary signal flow diagram of a signal flowing through a subpixel when the driving voltage line is normal in the display device according to the present disclosure.

FIG. 6 illustrates a signal flow diagram when a driving voltage line is normal in a display device according to the present disclosure, and FIG. 7 illustrates an exemplary signal flow diagram of a signal flowing through a subpixel when the driving voltage line is normal in the display device according to aspects of the present disclosure.

When an overcurrent flows in the driving voltage line DVL or the display panel 110 by the subpixel driving voltage EVDD with a high potential voltage, the driving voltage line DVL may be disconnected or the display panel 110 may be burnt due to the overcurrent.

Therefore, in order to prevent such a problem, the display device 100 according to the present disclosure detects whether the driving voltage line DVL is defective by using a display driving reference voltage VpreR with a low potential voltage at a state that the subpixel driving voltage EVDD is not supplied to the driving voltage line DVL.

The subpixel driving voltage EVDD generally corresponds to a high potential voltage level of 20 V or higher, whereas the display driving reference voltage VpreR corresponds to a low potential voltage level of 3 V.

Referring to FIGS. 6 and 7, the display device 100 according to the present disclosure turns on the switching transistor SWT and the sensing transistor SENT by supplying the scan signal SCAN and the sense signal SENSE with a high level in order that the base voltage node N(EVSS) is electrically floated and the display driving reference voltage VpreR transmitted from the reference voltage line RVL is supplied through the driving voltage line DVL at a state that a subpixel driving voltage EVDD is not supplied or a low level subpixel driving voltage EVDD(Low) is supplied.

Here, the low level subpixel driving voltage EVDD(Low) has a level lower than the display driving reference voltage VpreR.

Accordingly, a current I(EVDD) flowing through the reference voltage line RVL by the display driving reference voltage VpreR is transmitted to a second node N2 of the driving transistor DRT through a turned-on sensing transistor SENT.

Meanwhile, since the switching transistor SWT is turned on by the high level scan signal SCAN, a data voltage Vdata of a level capable of turning on the driving transistor DRT through the data line DL may be supplied.

In this case, the period for detecting the defect of the driving voltage line DVL corresponds a period to which the subpixel driving voltage EVDD is not supplied (e.g., a blank period) or a low level subpixel driving voltage EVDD(Low) is supplied. Accordingly, the data voltage Vdata supplied to the driving transistor DRT may be set at a level capable of turning on the driving transistor DRT, but at a black data voltage Vdata(BLACK) indicating a black grayscale or luminance close to the black grayscale.

At this time, since the low level subpixel driving voltage EVDD(Low) is maintained at a level lower than the display driving reference voltage VpreR, the current I(EVDD) flowing from the reference voltage line RVL flows from the second node N2 to the third node N3 of the driving transistor DRT when the driving transistor DRT is turned on by the black data voltage Vdata(BLACK). That is, in this state, the second node N2 of the driving transistor DRT operates as a drain node, and the third node N3 of the driving transistor DRT operates as a source node.

Meanwhile, since the base voltage switching circuit SW is in a floating state by the control of the timing controller 140, the current transmitted from the reference voltage line RVL to the driving voltage line DVL does not flow to the base voltage node N(EVSS) when the driving voltage line DVL is in a normal state.

Accordingly, since there is no current flowing into the current detecting circuit 310 in a normal state, the current detecting circuit 310 generates a low level signal, and the timing controller 140 generates a low level defect detection signal BDP (Low) indicating that the driving voltage line DVL is in a normal state.

As a result, it is possible to detect the normal state of the driving voltage line DVL using the display driving reference voltage VpreR with the low potential voltage while the subpixel driving voltage EVDD with a high potential voltage is not supplied to the driving voltage line DVL.

Figure 8:
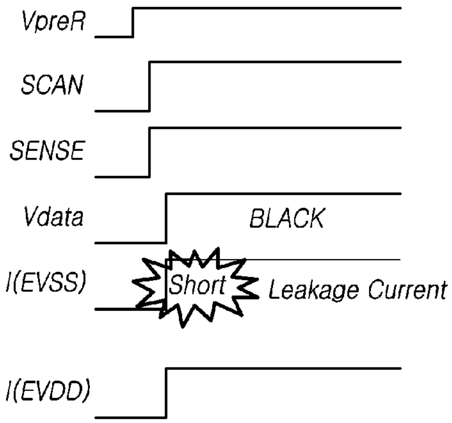
FIG. 8 illustrates an exemplary signal flow diagram when a driving voltage line is defective in a display device according to the present disclosure.
Figure 9:
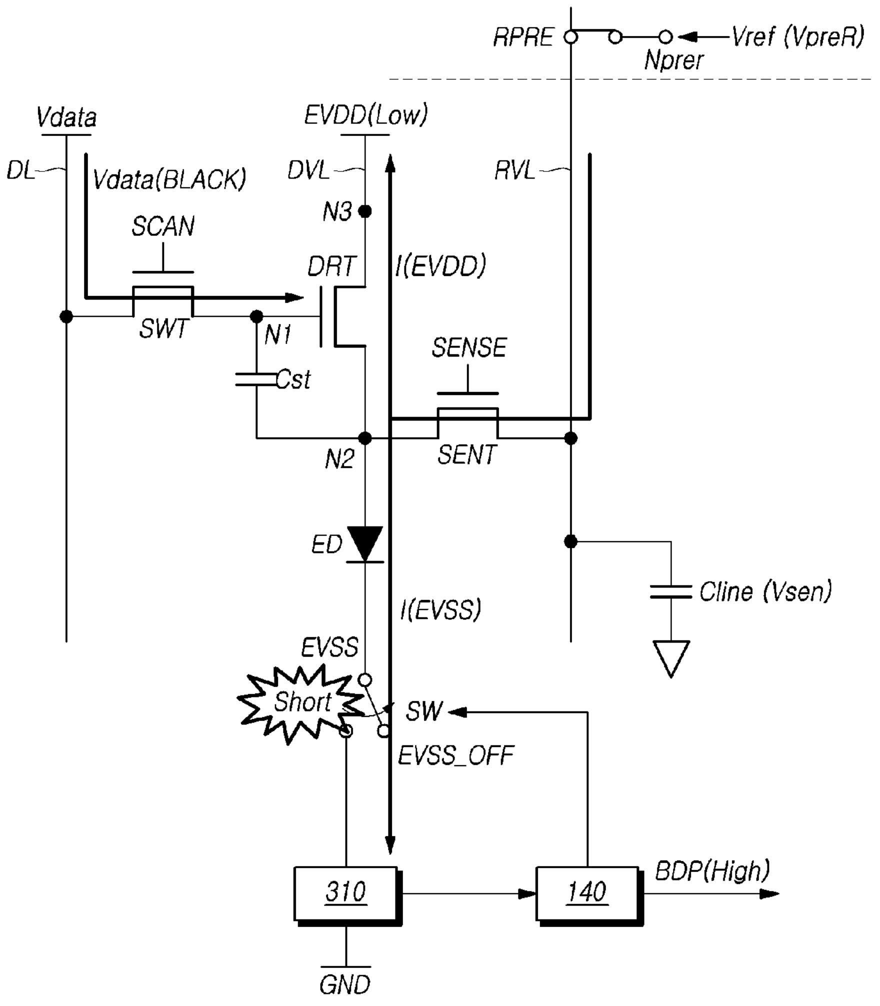
FIG. 9 illustrates an exemplary signal diagram flowing through a subpixel when the driving voltage line is defective in a display device according to the present disclosure.

FIG. 8 illustrates an exemplary signal flow diagram when a driving voltage line is defective in a display device according to the present disclosure, and FIG. 9 illustrates an exemplary signal diagram flowing through a subpixel when the driving voltage line is defective in a display device according to the present disclosure.

Referring to FIGS. 8 and 9, the display device 100 according to the present disclosure turns on the switching transistor SWT and the sensing transistor SENT by supplying the scan signal SCAN and the sense signal SENSE with a high level in order that the base voltage node N(EVSS) is electrically floated and the display driving reference voltage VpreR transmitted from the reference voltage line RVL is supplied through the driving voltage line DVL at a state that the subpixel driving voltage EVDD is not supplied or a low level subpixel driving voltage EVDD(Low) is supplied.

Accordingly, the current I(EVDD) flowing through the reference voltage line RVL by the display driving reference voltage VpreR is transmitted to the second node N2 of the driving transistor DRT through the turned-on sensing transistor SENT.

Meanwhile, since the switching transistor SWT is turned on by the high level scan signal SCAN, a data voltage Vdata of a high level capable of turning on the driving transistor DRT through the data line DL may be supplied.

In this case, the period for detecting the defect of the driving voltage line DVL is a period in which the subpixel driving voltage EVDD is not supplied (e.g., blank period) or a period in which a low level subpixel driving voltage EVDD(Low)) is supplied. Therefore, the data voltage Vdata supplied to the driving transistor DRT may be a level capable of turning on the driving transistor DRT, but may be a black data voltage Vdata(BLACK) representing a black grayscale or a luminance close to the black grayscale.

Since the subpixel driving voltage node is maintained at a low level, a current I(EVDD) transmitted from the reference voltage line RVL flows from the second node N2 to the third node N3 of the driving transistor DRT when the driving transistor DRT is turned on by the black data voltage Vdata(BLACK). That is, at this state, the second node N2 of the driving transistor DRT operates as a drain node, and the third node N3 of the driving transistor DRT operates as a source node.

Meanwhile, the base voltage switching circuit SW is in a floating state by the control of the timing controller 140. However, when the driving voltage line DVL is in a short-circuited state due to moisture or foreign substances, the reference voltage line RVL may be electrically connected to the ground GND even if the base voltage switching circuit SW is in floating state.

Accordingly, when the driving voltage line DVL is in a defective state, a portion of the current I(EVSS) among the currents flowing into the driving voltage line DVL flows to the ground GND through the base voltage node N(EVSS) even though the base voltage switching circuit SW is floating.

In this case, since the data voltage Vdata(BLACK) of the black grayscale is supplied through the data line DL, the light emitting element ED displays the black grayscale even though it emits light by the driving transistor DRT. Therefore, the user cannot recognize the light emission phenomenon due to a process for detecting current flowing through the driving voltage line DVL.

As a result, when the driving voltage line DVL is in a defective state, the current detecting circuit 310 may detect a current I(EVSS) flowing through the base voltage node N(EVSS) since the current I(EVSS) flowing into the current detecting circuit 310 exists even though the base voltage switching circuit SW is floating.

At this time, the current detecting circuit 310 generates a high level signal when the detected current is equal to or greater than the reference value. Accordingly, the timing controller 140 generates a defect detection signal BDP (High) with a high level indicating that the driving voltage line DVL is in a defective state.

As a result, it is possible to detect the defective state of the driving voltage line DVL using the display driving reference voltage VpreR with a low potential voltage without supplying the subpixel driving voltage EVDD with a high potential voltage to the driving voltage line RVL.

Figure 10:
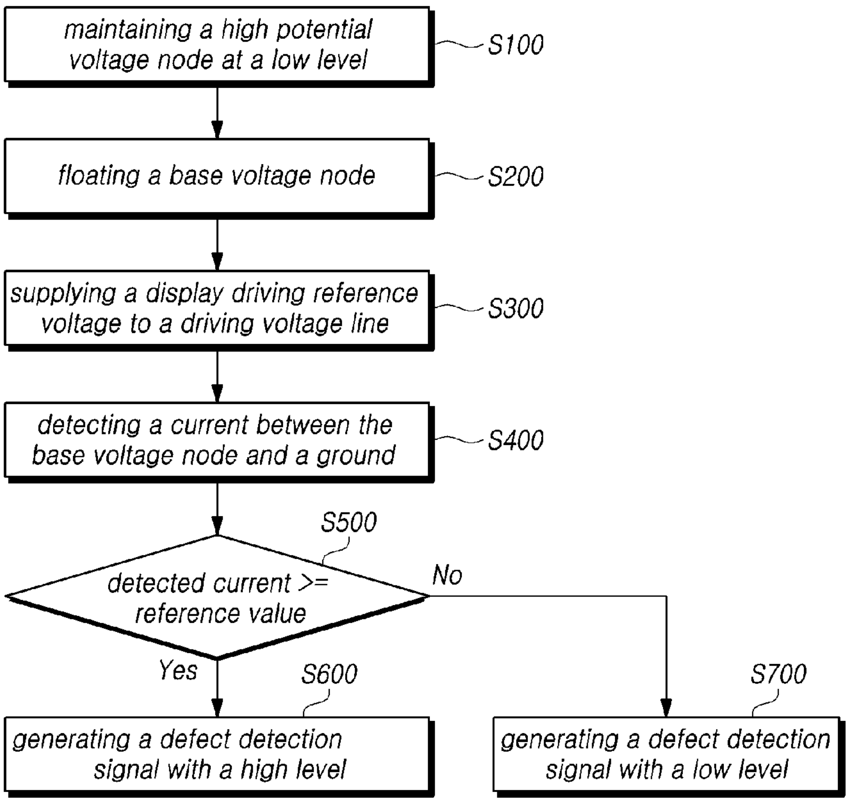
FIG. 10 illustrates a flowchart of a display driving method according to aspects of the present disclosure.

FIG. 10 illustrates a flowchart of a display driving method according to the present disclosure.

Referring to FIG. 10, the display driving method according to the present disclosure may include a step S100 of maintaining a high potential voltage node at a low level, a step S200 of floating a base voltage node N(EVSS), a step S300 of supplying a display driving reference voltage VpreR to a driving voltage line DVL, a step S400 of detecting a current between the base voltage node N(EVSS) and a ground GND, a step S500 of comparing the detected current with a reference value, a step S600 of generating a defect detection signal BDP(High) with a high level when the detected current is equal to or greater than the reference value, and a step S700 of generating a defect detection signal BDP(Low) with a low level when the detected current is less than the reference value.

The step S100 of maintaining a high potential voltage node at a low level is a process in which the third node N3 of the driving transistor DRT is not received the subpixel driving voltage EVDD with a high potential voltage and is maintaining at a low level state.

The step S200 of floating a base voltage node N(EVSS) is a process of blocking and floating the base voltage node N(EVSS) from the ground GND by controlling the base voltage switching circuit SW.

At this time, the step S100 of maintaining the subpixel driving voltage EVDD at a low level may be different in time from the step S200 of floating the base voltage node N(EVSS), and the order may be changed.

The step S300 of supplying a display driving reference voltage VpreR to a driving voltage line DVL is a process of supplying the display driving reference voltage VpreR to the reference voltage line RVL by turning on the display driving reference switch RPRE and the sensing transistor SENT, and forming a current path to transmit the current I(EVDD) flowing through the driving voltage line DVL to the subpixel driving voltage node by turning on the driving transistor DRT.

At this time, the driving transistor DRT may be turned on by supplying a data voltage Vdata(BLACK) of the black grayscale through the data line DL.

The step S400 of detecting a current between the base voltage node N(EVSS) and a ground GND is a process of detecting a current I(EVSS) flowing from the base voltage node N(EVSS) to the ground GND by the current detecting circuit 310 connected between the base voltage node N(EVSS) and the ground GND.

The step S500 of comparing the detected current with a reference value is a process of comparing a current detected in the current detecting circuit 310 with a reference value.

The step S600 of generating a defect detection signal BDP(High) with a high level when the detected current is equal to or greater than the reference value is a process of determining the driving voltage line DVL as a defective state such as a short circuit when the current detected in the current detecting circuit 310 is equal to or greater than the reference value while the base voltage node N(EVSS) is floating.

The step S700 of generating a defect detection signal BDP(Low) with a low level when the detected current is less than the reference value is a process of determining the driving voltage line DVL as a normal state when the current detected in the current detecting circuit 310 is less than the reference value while the base voltage node N(EVSS) is floating.

Through the above process, the display device 100 according to the present disclosure may detect a defect of the driving voltage line DVL or the display panel 110 before a high potential voltage such as the subpixel driving voltage EVDD is supplied, and may diminish a damage to the display panel 110 due to the high potential voltage by using the display driving reference voltage VpreR.

A brief description of the aspects of the present disclosure described above is as follows.

The display device 100 according to the present disclosure may include a display panel 110 in which a plurality of subpixels SP with a light emitting element ED that emits light by a high potential voltage supplied to a driving voltage line DVL, and a plurality of reference voltage lines RVL connected to the plurality of subpixels SP to detect a characteristic value are disposed, a data driving circuit 130 configured to supply a low potential voltage to the driving voltage line DVL through the plurality of reference voltage lines RVL, a base voltage switching circuit SW configured to control a base voltage node N(EVSS) connected to a cathode electrode of the light emitting element ED, a current detecting circuit 310 configured to detect a current flowing between the base voltage node N(EVSS) and a ground GND, and a timing controller 140 configured to control the base voltage switching circuit SW and generate a defect detection signal BDP for the driving voltage line DVL according to a current detected by the current detecting circuit 310.

The low potential voltage is supplied in a period in which a high potential voltage is not supplied to the driving voltage line DVL.

The low potential voltage is supplied to the driving voltage line DVL in a period in which the base voltage node N(EVSS) is floated.

The low potential voltage is a display driving reference voltage VpreR supplied in a display driving period.

The subpixel SP includes a driving transistor DRT of which third node N3 receives the high potential voltage and which provides a current to the light emitting element ED through the driving voltage line DVL, a switching transistor SWT electrically connected between a first node N1 of the driving transistor DRT and a data line DL, a sensing transistor SENT electrically connected between a second node N2 of the driving transistor DRT and the reference voltage line RVL, a storage capacitor Cst electrically connected between the first node N1 and the second node N2 of the driving transistor DRT, and the light emitting element ED electrically connected between the second node N2 of the driving transistor DRT and the base voltage node N(EVSS).

In the display device 100 according to the present disclosure, a first current path flowing to the third node N3 of the driving transistor DRT through the sensing transistor SENT and the driving transistor DRT is formed by the low potential voltage.

In the display device 100 according to the present disclosure, a second current path flowing from the base voltage node N(EVSS) to the ground GND is formed when the driving voltage line DVL is defective.

The current detecting circuit 310 includes a resistor 312 electrically connected between the base voltage node N(EVSS) and the ground GND, an operational amplifier 314 having an inverting input terminal and a non-inverting input terminal connected to both ends of the resistor 312 to generate a voltage proportional to a current flowing through the resistor 312, and a level detecting circuit 318 configured to generate a result of comparing an output value from the operational amplifier 314 and a reference value.

The timing controller 140 is configured to generate a defect detection signal BDP for the driving voltage line DVL according to an output value of the level detecting circuit 318.

A display driving method for driving a display device 100 including a display panel 110 in which a plurality of subpixels SP with a light emitting element ED that emits light by a high potential voltage supplied to a driving voltage line DVL and a plurality of reference voltage lines RVL connected to the plurality of subpixels SP to detect a characteristic value are disposed, according to the present disclosure comprising, maintaining a high potential voltage node at a low level, floating a base voltage node N(EVSS), supplying a low potential voltage to a driving voltage line DVL, detecting a current between the base voltage node N(EVSS) and a ground GND, comparing a detected current with a reference value, and generating a defect detection signal BDP according to a result of comparing the detected current with the reference value.

The low potential voltage is supplied through the plurality of reference voltage lines RVL.

The low potential voltage is supplied in a period to which the high potential voltage is not supplied.

The low potential voltage is a display driving reference voltage VpreR supplied in a display driving period.

The subpixel SP includes a driving transistor DRT of which third node N3 receives the high potential voltage and which provides a current to the light emitting element ED through the driving voltage line DVL, a switching transistor SWT electrically connected between a first node N1 of the driving transistor DRT and a data line DL, a sensing transistor SENT electrically connected between a second node N2 of the driving transistor DRT and the reference voltage line RVL, a storage capacitor Cst electrically connected between the first node N1 and the second node N2 of the driving transistor DRT, and the light emitting element ED electrically connected between the second node N2 of the driving transistor DRT and the base voltage node N(EVSS).

In the display driving method according to the present disclosure, a first current path flowing to the third node N3 of the driving transistor DRT through the sensing transistor SENT and the driving transistor DRT is formed by the low potential voltage.

In the display driving method according to the present disclosure, a second current path flowing from the base voltage node N(EVSS) to the ground GND is formed when the driving voltage line DVL is defective.

The generating a defect detection signal BDP includes generating a defect detection signal BDP(High) with a high level when the detected current is equal to or greater than the reference value, and generating a defect detection signal BDP(Low) with a low level when the detected current is less than the reference value.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the aspects disclosed in the present disclosure are intended to illustrate the scope of the technical idea of the present disclosure, and the scope of the present disclosure is not limited by the aspect. The scope of the present disclosure shall be construed on the basis of the accompanying claims in such a manner that all of the technical ideas included within the scope equivalent to the claims belong to the present disclosure.

What is claimed is:

1. A display device comprising:

a display panel in which a plurality of subpixels including a light emitting element that emits light by a subpixel driving voltage supplied to a driving voltage line, and a plurality of reference voltage lines connected to the plurality of subpixels to detect a characteristic value are disposed;

a data driving circuit configured to supply a display driving reference voltage lower than the subpixel driving voltage, to the driving voltage line through the plurality of reference voltage lines;

a base voltage switching circuit configured to control a base voltage node connected to a cathode electrode of the light emitting element;

a current detecting circuit configured to detect a current flowing between the base voltage node and a ground; and a timing controller configured to control the base voltage switching circuit and generate a defect detection signal for the driving voltage line according to a current detected from the current detecting circuit by supplying the display driving reference voltage to the driving voltage line through a reference voltage line during a period in which the subpixel driving voltage is not supplied or has a level lower than the display driving reference voltage.

2. The display device according to claim 1, wherein the data driving circuit is configured to supply the display driving reference voltage to the driving voltage line in a period in which the base voltage node is floated.

3. The display device according to claim 1, wherein a subpixel of the plurality of subpixels includes:

a driving transistor of which third node receives the high potential subpixel driving voltage and which provides a current to the light emitting element through the driving voltage line;

a switching transistor electrically connected between a first node of the driving transistor and a data line;

a sensing transistor electrically connected between a second node of the driving transistor and a corresponding reference voltage line of the plurality of reference voltage lines; and a storage capacitor electrically connected between the first node and the second node of the driving transistor;

wherein the light emitting element is electrically connected between the second node of the driving transistor and the base voltage node.

4. The display device according to claim 3, wherein the subpixel is configured such that a first current path flowing to the third node of the driving transistor through the sensing transistor and the driving transistor is formed by the display driving reference voltage.

5. The display device according to claim 1, wherein the subpixel is configured such that a second current path flowing from the base voltage node to the ground is formed when the driving voltage line is defective.

6. The display device according to claim 1, wherein the current detecting circuit includes:

a resistor electrically connected between the base voltage node and the ground;

an operational amplifier having an inverting input terminal and a non-inverting input terminal connected to both ends of the resistor to generate a voltage proportional to a current flowing through the resistor; and a level detecting circuit configured to generate a result of comparing an output value from the operational amplifier and a reference value.

7. The display device according to claim 6, wherein the timing controller is configured to generate a defect detection signal for the driving voltage line according to an output value of the level detecting circuit.

8. A display driving method for driving a display device including a display panel in which a plurality of subpixels with a light emitting element that emits light by a subpixel driving voltage supplied to a driving voltage line and a plurality of reference voltage lines connected to the plurality of subpixels to detect a characteristic value are disposed, comprising:

maintaining a subpixel driving voltage node at a level lower than a display driving reference voltage;

floating a base voltage node;

supplying a display driving reference voltage lower than the subpixel driving voltage, to a driving voltage line through a reference voltage line during a period in which the subpixel driving voltage is not supplied or has a level lower than the display driving reference voltage;

detecting a current between the base voltage node and a ground;

comparing a detected current with a reference value; and generating a defect detection signal according to a result of comparing the detected current with the reference value.

9. The display driving method according to claim 8, wherein a subpixel of the plurality of subpixels includes:

a driving transistor of which third node receives the subpixel driving voltage and which provides a current to the light emitting element through the driving voltage line;

a switching transistor electrically connected between a first node of the driving transistor and a data line;

a sensing transistor electrically connected between a second node of the driving transistor and a corresponding reference voltage line of the plurality of reference voltage lines; and a storage capacitor electrically connected between the first node and the second node of the driving transistor; and wherein the light emitting element is electrically connected between the second node of the driving transistor and the base voltage node.

10. The display driving method according to claim 8, wherein a first current path flowing to the third node of the driving transistor through the sensing transistor and the driving transistor is formed by the display driving reference voltage.

11. The display driving method according to claim 8, wherein a second current path flowing from the base voltage node to the ground is formed when the driving voltage line is defective.

12. The display driving method according to claim 8, wherein the generating a defect detection signal includes:

generating a defect detection signal with a high level when the detected current is equal to or greater than the reference value; and generating a defect detection signal with a low level lower than the high level when the detected current is less than the reference value.

* * * * *